United States Patent Office 2,922,788
Patented Jan. 26, 1960

2,922,788
PHENYLPIPERAZINE COMPOUNDS AND PROCESS FOR PRODUCING THE SAME

Robert F. Parcell, St. Clair Shores, Mich., assignor to Parke, Davis & Company, Detroit, Mich., a corporation of Michigan No Drawing. Application May 26, 1958
Serial No. 737,505

6 Claims. (Cl. 260—268)

This invention relates to substituted N-phenylpiperazine compounds and to means for obtaining the same. More particularly, the invention relates to N-phenylpiperazine compounds and salts thereof which, in free base form, have the formula,

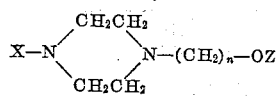

where X represents one of the substituted phenyl radicals

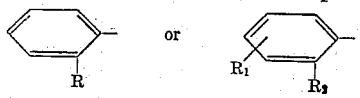

in which R represents an allyloxy radical or an alkyl or alkoxy radical containing not more than 4 carbon atoms, and $R_1$ and $R_2$ each represent a bromine or chlorine radical, an alkyl radical containing 1 to 3 carbon atoms or an alkoxy radical containing 1 to 5 carbon atoms, $R_1$ being substituted in the phenyl ring at one of the 3 and 5 positions; $n$ is an integer from 3 to 6 inclusive, and Z represents hydrogen or a lower fatty acid acyl group.

The free base compounds of the invention form well-defined acid addition salts upon reaction with acids especially mineral acids such as hydrochloric, hydrobromic, sulfuric, phosphoric, hydriodic and the like.

In accordance with the invention, the N-phenylpiperazine compounds having the aforementioned formula can be produced in a number of different ways. One general method for preparing these compounds involves reacting an N-phenylpiperazine formula,

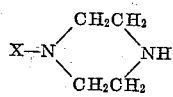

with an ω-haloalkanol of formula,

Hal—$(CH_2)_n$OZ where Hal is a halogen atom and $n$, X and Z have the same significance as given above. In carrying out the process it is preferable to employ about two equivalents of the N-phenylpiperazine to each equivalent of the ω-haloalkanol and to use an anhydrous organic solvent such as benzene, toluene, xylene and the like; low boiling alcohols such as methanol, ethanol, isopropanol, isobutanol, and the like; and low boiling ketones such as acetone, methylethyl ketone and the like. The temperature of the reaction is not particularly critical and can be varied in the range from room temperature to about 175° C. Preferably, the reaction is carried out at the reflux temperature of the reaction mixture.

The piperazine alkanols of the invention, in which Z is hydrogen, can be converted to the corresponding alkanol esters by acylation. In carrying out the reaction an acylating agent such as an acyl halide or anhydride is employed in an inert anhydrous organic solvent such as an aliphatic ketone, aliphatic ether, benzene, toluene, dioxane and the like. In the case where acidic anhydride is employed as an acylating agent, acetic acid can be advantageously employed as a solvent. The temperature of the reaction is not particularly critical and can be varied over a considerable range. While temperatures in the range from 0 to 150° C. are ordinarily satisfactory, the reaction is preferably carried out at the reflux temperature of the reaction mixture. The relative quantities of the reactants can be varied within wide limits. However, for reasons of economy as well as ease of purification of the product, an excess of the acylating agent is generally employed.

The alkanol esters of the invention can be converted by hydrolysis or alcoholysis to the corresponding piperazine alkanols. Hydrolysis can be conveniently carried out with an aqueous alkali metal hydride or alkaline earth metal hydride in the organic solvent such as a lower aliphatic alcohol or lower aliphatic ketone. Alcoholysis can be carried out with catalytic amounts of an alkali metal alcoholate in an anhydrous organic solvent such as a lower aliphatic alcohol. Alcoholysis or hydrolysis, as the case may be, can be effected over a wide temperature range, but is preferably carried out at the boiling point of the reaction mixture.

Another method for the preparation of the compounds of the invention involves reducing a 4-phenyl-1-carbalkoxypiperazine of formula,

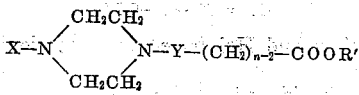

where R' is an alkyl group containing not more than 4 carbon atoms, Y is a —$CH_2$— or —CO— group, and X and $n$ have the aforementioned significance. Reduction can be carried out in accordance with the invention in a number of different ways, preferably by catalytic means employing gaseous hydrogen and a metal catalyst such as copper chromite or by chemical means employing metallic sodium and an alcohol or a complex oxidizable metal hydride such as lithium aluminum hydride. Reduction with a complex oxidizable metal hydride is preferred in the case where the starting material contains an allyloxy group inasmuch as the previously mentioned reducing agents tend to reduce the allyl radical thereby lowering the yield of the desired product. In the case where Y in the starting material is a carbonyl group —CO—, reduction by catalytic means or reduction with a complex oxidizable metal hydride is preferred. In carrying out the reduction with gaseous hydrogen, a copper chromite catalyst is employed. In the presence of an inert organic solvent, preferably a hydrogen pressure of about 200-300 atmospheres at a temperature in the range of about 200-300° C.

Solvents which can be used for the reaction include lower aliphatic alcohols, lower aliphatic ethers and cyclic aliphatic ethers. Some examples of these solvents are methanol, ethanol, n-propanol, isopropanol, diethyl ether, di-isopropyl ether, dibutyl ether, dioxane and the like. Reduction with lithium aluminum hydride is accomplished in an anhydrous non-hydroxylic organic solvent. Some examples of suitable solvents are diethyl ether, di-isopropyl ether, di-butyl ether, dioxane, tetrahydrofurane, ethylene glycol dimethyl ether and ethylene glycol diethyl ether. Preferably, lithium aluminum hydride is employed in excess of the theoretical amount required. Best results are obtained by combining the reactants slowly. The temperature during the reduction is not particularly critical. The optimum temperature is in the range of about 15 to 35° C. Reduction with sodium metal in the presence of alcohol is accomplished preferably at the reflux temperature of the reaction mixture. Some examples of suitable alcohols are methanol, ethanol, n-propanol, isopropanol, n-butanol, and the like. For best results sodium is employed in excess of the theoretical amount required. The piperazine alkanols produced by this method can be converted to the corresponding esters by acylation in the manner indicated hereinabove.

The 4-phenyl-1-carbalkoxypiperazines having the formula,

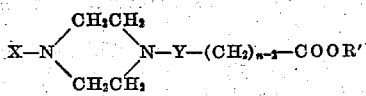

can be prepared conveniently by reactnig an N-phenylpiperazine having the formula,

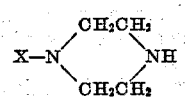

with (1) an ω-haloalkyl nitrile having the formula,

followed by treatment of the piperazine alkane nitrile so produced with anhydrous alcoholic hydrohalic acid in the cold to produce the corresponding imine ester hydrohalide, and hydrolysis of the latter, or (2) an ω-haloalkanoic ester having the formula, Hal—(CH$_2$)$_{n-1}$—COOR' or, in the case where $n$ is 3, (3) an acrylic acid ester having the formula,

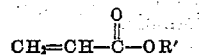

where X, R', $n$ and Hal have the same significance as given above.

In the production of the 4-phenyl-1-carbalkoxy-piperazines starting from the ω-haloalkyl nitriles and N-phenylpiperazines, the first step is accomplished in the same manner as is described above for the reaction of N-phenylpiperazine and ω-haloalkanol. The resulting 4-phenyl-1-piperazinealkanenitrile is treated in the cold, preferably at a temperature in the range of about 0 to 20° C., with at least one equivalent of a hydrohalic acid under anhydrous conditions in the presence of a lower aliphatic alcohol. The imino ester hydrochloride which is produced is then hydrolyzed, preferably in situ, by heating the reaction mixture, preferably at reflux temperature, in the presence of one equivalent of water. Production of the 4-phenyl-1-carbalkoxypiperazines starting from the ω-haloalkanoic ester and N-phenylpiperazine is accomplished in the same manner as is described above for the reaction of N-phenylpiperazine and ω-haloalkanol. Production of the 4-phenyl-1-carbalkoxypiperazines starting from the acrylic acid ester and N-phenylpiperazine is accomplished in the same manner as is described above for the reaction of N-phenylpiperazine and ω-haloalkanol, preferably at room temperature employing an excess of the ester. The 4-phenyl-1-carbalkoxypiperazines of formula,

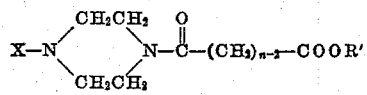

can be prepared by reacting an N-phenylpiperazine of formula,

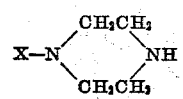

with a dicarboxylic acid derivative of formula,

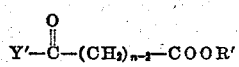

in the same manner as indicated above for the reaction of ω-haloalkanol with N-phenylpiperazine, where Y' is a halogen atom or an alkoxy group containing not more than four carbon atoms and X, R' and $n$ have the same significance as given above.

A special method for the preparation of the 4-phenyl-1-piperazine propanols comprises reacting an N-phenylpiperazine of formula,

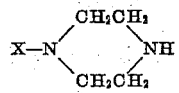

with allyl alcohol in the presence of an alkali metal alcoholate of allyl alcohol; where X has the same significance as given above. The temperature of the reaction is not critical and can be varied over a wide range. Temperatures in the range from 75 to 100° C. are satisfactory, particularly reflux temperatures. For best results, the reaction is carried out in the absence of any solvent other than allyl alcohol. The 4-phenyl-1-piperazine propanols produced by this method can be converted to the corresponding esters by acylation in the manner indicated hereinabove.

As indicated above, the piperazine alkanol compounds of the invention occur in both the free base and acid addition salt forms. In some instances it will be desirable to obtain the acid addition salt from the free base. The salt can be prepared by reacting the free base with the corresponding acid in the presence of a suitable organic solvent in which the resulting salt is insoluble, permitting isolation of the desired salt by filtration, decantation, etc. On the other hand in those instances where it is desired to convert the acid addition salt to the free base, the same can be accomplished by dissolving the acid salt in a suitable solvent such as water, methanol, etc., neutralizing the solution with a base such as sodium hydroxide, ammonium hydroxide, alkali metal carbonate and the like, and isolating the desired free base by extraction or other suitable means.

The products of the invention possess significant hypotensive activity; consequently, they have application, when administered orally in suitable dosage form, in the treatment of hypotension and similar conditions. The recommended oral dosage is about 75 to 600 mg. per day. This dosage is conveniently administered in about 25 to 100 mg. quantities 3 to 6 times a day until the condition under treatment is relieved.

The invention is illustrated by the following examples:

*Example 1*

A mixture of 38.4 g. of 1-o-methoxyphenylpiperazine, 16.2 g. of delta-bromovaleronitrile and 200 ml. of toluene is refluxed for two hours. The reaction mixture is cooled, filtered, and the toluene is removed from the filtrate under reduced pressure. The residual oil containing 4-o-methoxyphenyl-1-piperazinevaleronitrile is dissolved in 350 ml. of absolute alcohol and the resulting solution is treated with anhydrous hydrogen chloride at 0.5° C. When the solution is complete, 1.8 ml. of water is added and the solution is slowly warmed to reflux with stirring and refluxing is continued for four hours. The reaction mixture is filtered while hot and the filtrate is evaporated to dryness under reduced pressure. The residue is dissolved in water, treated with an excess sodium bicarbonate and extracted with ether. The ether extracts are combined and dried over magnesium sulfate. After removing the desiccant, the solution of ethyl 4-o-methoxyphenyl-1-piperazinevalerate is slowly added with stirring to a solution of 4 g. of lithium aluminum hydride in 500 ml. of ether. When the reduction is complete, aqueous alkali is cautiously added to completely decompose the complex. The ethereal solution of 4-o-methoxyphenyl-1-piperazinepentanol is decanted and dried with anhydrous potassium carbonate. After filtering off the precipitate, the solvents are removed from the filtrate by distillation under reduced pressure. The residual product, 4-o-methoxyphenyl-1-piperazinepentanol, has the formula,

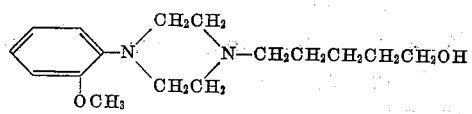

An alcoholic solution containing 2.9 g. of hydrogen bromide is added to a solution of 10 g. of 4-o-methoxyphenyl-1-piperazinepentanol in ether. The resulting precipitate is removed by filtration and recrystallized from isopropanol. The product obtained, 4-o-methoxyphenyl-1-piperazinepentanol hydrobromide, has the formula,

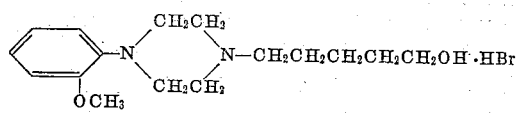

Example 2

A solution of 12 g. of 1-o-methoxyphenylpiperazine and 100 ml. of diethyl adipate is maintained at 100° C. for three hours. The ethanol which is liberated is removed under reduced pressure and the solution again is maintained at 100° C. for three hours. The reaction mixture is cooled and diluted with 800 ml. of dry ether and treated with an excess of dry hydrogen chloride. The organic solvents are decanted and the residual gum containing 4-o-methoxyphenyl-1-delta-carbethoxyvalerylpiperazine hydrochloride is treated with an excess of cold dilute aqueous sodium bicarbonate and extracted with ether. The ether extract is dried over anhydrous magnesium sulfate and the desiccant is removed by filtration. The dry ethereal solution of 4-o-methoxyphenyl-1-delta-carbethoxyvalerylpiperazine is slowly added to a stirred solution of 7 g. of lithium aluminum hydride in 500 ml. of dry ether. When the reaction is complete, an excess of aqueous alkali is added with caution and the ethereal layer is removed and dried over anhydrous potassium carbonate. After the desiccant has been removed by filtration, the filtrate is poured into isopropanol containing an excess of hydrogen chloride to form 4-o-methoxyphenyl-1-piperazinehexanol dihydrochloride which is isolated by filtration; M.P. 185–187° C. after recrystallization from a mixture of isopropanol and ether. This product has the formula,

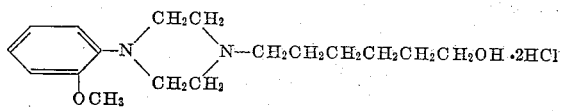

Example 3

17.9 grams of 5-carbomethoxyvalerylchloride is added to a solution of 38.4 g. of 1-o-methoxyphenylpiperazine and 500 ml. of benzene. The mixture is stirred for thirty minutes, filtered, and the filtrate is concentrated to about 75 ml. and diluted with 300 ml. of anhydrous ether. The solution, containing 4-o-methoxyphenyl-1-delta-carbomethoxyvalerylpiperazine, is slowly added to a stirred solution of 7 g. of lithium aluminum hydride and 500 ml. of anhydrous ether. When the reduction is complete, an excess of aqueous alkali is cautiously added. The ethereal layer is removed and dried over anhydrous potassium carbonate. The potassium carbonate is then removed by filtration and the solvents removed from the filtrate by distillation under reduced pressure. The residual product, 4-o-methoxyphenyl-1-piperazinehexanol, has the formula,

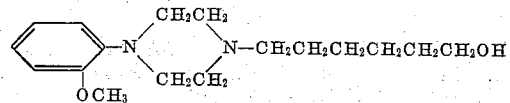

The residual product is converted to the dihydrochloride by the addition of an excess of alcoholic hydrogen chloride. The white precipitate which forms is removed by filtration and recrystallized from isopropanol to yield 4-o-methoxyphenyl-1-piperazinehexanol dihydrochloride, having a melting point of 185–187° C. This compound has the formula,

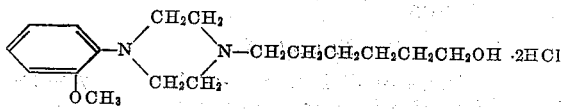

5-carbomethoxyvaleryl chloride, employed as a starting material, can be prepared in quantitative yield by refluxing a solution of 100 g. of monomethyl adipate and 120 g. of thionyl chloride in 250 ml. of carbon tetrachloride until the evolution of hydrogen chloride is complete (1½ to 2 hours), concentrating the reaction mixture to about 200 ml. and distilling the residue under reduced pressure. 5-carbomethoxyvaleryl chloride boils at 126–127° C. (24 mm. mercury).

Example 4

A mixture of 38.4 g. of 1-o-methoxyphenylpiperazine, 19.5 g. of ethyl γ-bromobutyrate and 200 ml. of benzene is stirred at reflux temperature for twelve hours. The reaction mixture is cooled, filtered, and the solvent is removed from the filtrate by distillation. The residue is distilled under reduced pressure to yield ethyl 4-o-methoxyphenyl-1-piperazinebutyrate having a boiling point of 170–177° C. (0.6 mm. mercury). This product is dissolved in anhydrous ether and added with stirring to 4 g. of lithium aluminum hydride dissolved in 500 ml. of anhydrous ether. When reduction is complete, an excess of aqueous alkali is added and the ethereal solution of 4-o-methoxyphenyl-1-piperazinebutanol is decanted and dried with anhydrous potassium carbonate. The drying agent is removed by filtration and the ether is removed from the filtrate by evaporation on a water bath. The residual product, 4-o-methoxyphenyl-1-piperazinebutanol, has the formula,

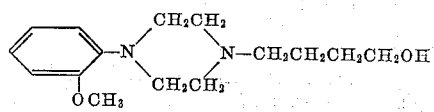

The free base is converted to the monohydrochloride by the addition of one equivalent of isopropanolic hydrogen chloride. The product, 4-o-methoxyphenyl-1-piperazinebutanol monohydrochloride, is isolated by filtration; M.P. 156–158° C. after recrystallization from isopropanol. This product has the formula,

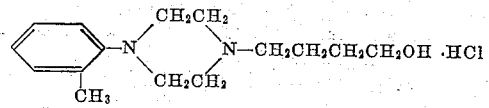

Example 5

A mixture of 38.4 g. of 1-o-methoxyphenylpiperazine, 13.9 g. of trimethylenebromohydrin and 150 ml. of benzene is stirred and refluxed for sixteen hours. The reaction mixture is cooled, filtered, and the solvent is removed from the filtrate by distillation under reduced pressure. The residual product, 4-o-methoxyphenyl-1-piperazinepropanol, has the formula,

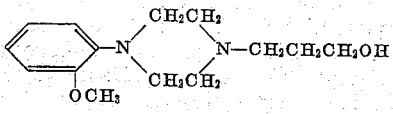

The free base product is converted to the monohydrochloride by dissolving in ether and adding one equivalent of dry hydrogen chloride. The 4-o-methoxyphenyl-1-piperazinepropanol monohydrochloride so produced is isolated by filtering and recrystallizing from isopropanol; M.P. 188–189° C. This product has the formula,

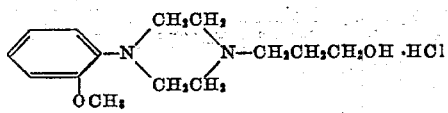

Example 6

(a) A mixture of 41.2 g. of 1-o-ethoxyphenylpiperazine, 16.7 g. of pentamethylene bromohydrin and 250 ml. of benzene is refluxed for twenty-four hours with stirring; 150 ml. of ether is then added, the mixture is shaken well and the benzene layer is decanted. The solvent is removed by distillation and the residual oil is triturated with low-boiling-point petroleum ether. The solid obtained is then recrystallized from a mixture of ether and low-boiling-point petroleum ether to yield crystalline 4-o-ethoxyphenyl-1-piperazinepentanol; M.P. 43–45° C. This product has the formula,

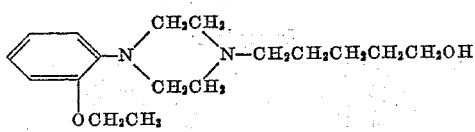

(b) 4-o-ethoxyphenyl-1-piperazinepentanol can be converted to the corresponding acetate esters in the following manner: 5 g. of 4-o-ethoxyphenyl-1-piperazinepentanol is dissolved in a mixture of 10 ml. of glacial acetic acid and 1.5 ml. of acetic anhydride. The solution is stirred and warmed for one-half hour and is then treated with one equivalent of isopropanolic hydrogen chloride and diluted with ether. The product, which separates, is collected and recrystallized from isopropanol and ether to yield the hydrochloride salt of 4-o-ethoxyphenyl-1-piperazinepentanol acetate. This product, which has the formula,

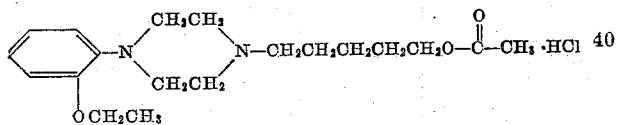

is converted to the corresponding free base, 4-o-ethoxyphenyl-1-piperazinepentanol acetate, by dissolving in water, neutralizing the solution with sodium carbonate and recovering the free base from the resulting mixture by extraction with ether.

The above starting material, 1-o-ethoxyphenylpiperazine, can be prepared by the following method: A solution of 90 g. of o-phenetidine and 100 g. of bis($\beta$-bromoethyl)-amine hydrobromide in 400 ml. of dry butanol is stirred and refluxed for sixteen hours. 34 grams of anhydrous sodium carbonate is added and the butanol and excess o-phenetidine is removed by steam distillation. The residual solution is made basic with aqueous sodium hydroxide and extracted with benzene. The benzene is removed by distillation and the residue is distilled in vacuo. The fraction which has a boiling point of 111–114° C. (0.7 mm. mercury) is 1-o-ethoxyphenylpiperazine.

Example 7

(a) A solution of 43.2 g. of 1-o-propoxyphenylpiperazine and 21 g. of 5-bromopentan-1-ol acetate ester in 200 ml. of toluene is stirred and refluxed for twelve hours. 100 ml. of toluene is removed by distillation and the residual solution is cooled and diluted to 600 ml. with ether. The precipitated 1-o-propoxyphenylpiperazine hydrobromide is removed and the solvent is taken off under reduced pressure. The residual oil is divided into two equal portions and one portion is treated with one equivalent of isopropanolic hydrogen chloride. The resulting precipitate is collected and recrystallized from isopropanol. The product, 4-o-propoxyphenyl-1-piperazinepentanol acetate, monohydrochloride, has the formula,

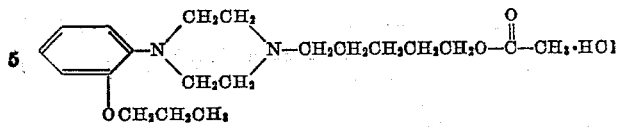

(b) The remaining portion of the residual oil is dissolved in 50 ml. of methanol. A solution of 3 g. of sodium hydroxide in 10 ml. of water, or a solution of 1 g. of sodium methoxide in absolute alcohol, is added and the resulting solution refluxed for six hours. The solvent is removed by distillation and 150 ml. of water is added to the residue. This mixture is extracted with ether and the ethereal solution is dried over anhydrous magnesium sulfate. The desiccant is removed by filtration or decantation and the ether is removed by distillation. The residual product is 4-o-propoxyphenyl-1-piperazinepentanol which melts at 58–60° C. after recrystallization from a mixture of ether and low-boiling-point petroleum ether. The product has the formula,

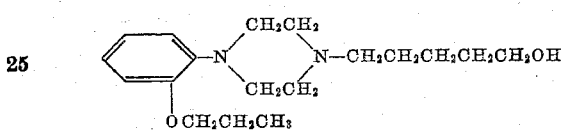

The free base is converted to the monohydrochloride by addition of one equivalent of isopropanolic hydrogen chloride. The mixture is diluted with ether and the precipitate is removed by filtration and recrystallized from a mixture of isopropanol and ether. The product, 4-o-propoxyphenyl-1-piperazinepentanol, monohydrochloride, has the formula,

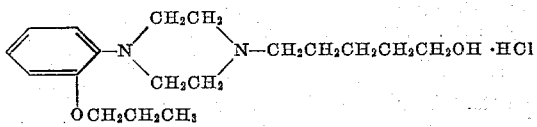

The starting materials employed can be prepared in the following manner.

*1-o-propoxyphenylpiperazine.*—A solution of 151 g. of o-propoxyaniline and 156 g. of bis($\beta$-bromoethyl)-amine hydrobromide and 400 ml. of dry butanol is stirred at reflux temperature for twenty hours. 53 g. of anhydrous sodium carbonate is added and the excess butanol and o-propoxyaniline is removed by steam distillation. The remaining solution is made basic with aqueous sodium hydroxide and the solution is extracted with ether. The ethereal solution is dried and the ether is then removed by distillation. The residue is subjected to vacuum distillation to provide 1-o-propoxyphenylpiperazine in the distillate fraction boiling at 132–135° C. (1.5 mm. mercury).

*5-bromopentan-1-ol acetate.*—2 grams of granulated zinc is added to 140 g. of acetyl bromide containing traces of hydrogen bromide and the mixture is stirred and warmed gently for twenty minutes. 86 grams of tetrahydropyran is added and the mixture is stirred at 60–70° C. for two hours, maintaining this temperature by cooling as necessary. The temperature is then increased to 90–100° C. and maintained for thirty minutes. The reaction mixture is distilled under reduced pressure to provide an almost quantitative yield of 5-bromopentan-1-ol acetate; B.P. 109–111° C. (14 mm. mercury).

Example 8

A solution of 46 g. of 1-o-butoxyphenylpiperazine and 21 g. of 5-bromopentan-1-ol acetate ester in 200 ml. of toluene is stirred and refluxed for fifteen hours. 100 ml. of toluene is removed by distillation and the residual solution is cooled and diluted to 600 ml. with ether.

The precipitated 1-o-butoxyphenylpiperazine hydrobromide is removed and the solvent taken off under reduced pressure. The residual oil is dissolved in 100 ml. of methanol. A solution of 6 g. of sodium hydroxide in 10 ml. of water, or 1 g. of sodium methoxide in absolute methanol, is added and the resulting solution refluxed for six hours. The solvent is removed by distillation and 150 ml. of water is added to the residue. This mixture is extracted with ether and the ethereal solution is dried over anhydrous magnesium sulfate. The desiccant is removed by distillation. The residual product, 4-o-butoxyphenyl-1-piperazinepentanol, has the formula,

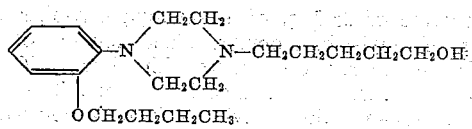

In order to convert the product to the monohydrochloride, one equivalent of isopropanolic hydrogen chloride is added and the resulting precipitate is isolated and recrystallized from isopropanol to yield 4-o-butoxyphenyl-1-piperazinepentanol hydrochloride which has the formula,

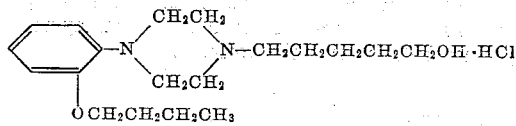

1-o-butoxyphenylpiperazine, employed as a starting material, can be prepared from o-butoxyaniline and bis-(β-bromoethyl)amine by the same methods indicated hereinabove for the preparation of 1-o-propoxyphenylpiperazine.

*Example 9*

(a) A mixture of 43.5 g. of 1-o-allyloxyphenylpiperazine, 21 g. of 5-bromopentanol-1-ol acetate and 200 ml. of benzene is stirred and refluxed for twenty hours. 150 ml. of benzene is removed by distillation, and the residual mixture is cooled and diluted with 500 ml. of dry ether. The precipitate is removed by filtration, and the solvents are removed from the filtrate under reduced pressure. The residual oil is divided into two equal portions. One portion is dissolved in ether and treated with one equivalent of isopropanolic hydrogen chloride. The product is separated by filtration and recrystallized from isopropanol and ether to provide 4-o-allyloxyphenyl-1-piperazinepentanol acetate, monohydrochloride which has the formula,

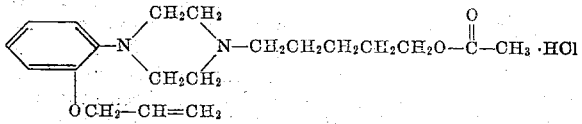

(b) The remaining portion of the residual oil obtained in (a) above is dissolved in 300 ml. of absolute methanol, 2 g. of sodium methoxide is added, and the solution is evaporated on a steam bath. The residue is diluted with 500 ml. ether, washed three times with water, and dried over anhydrous magnesium sulfate. The desiccant is filtered off and the filtrate is concentrated by evaporation on a steam bath. The residue is dissolved in ether and treated with one equivalent of isopropanolic hydrogen chloride. The product which separates is isolated and recrystallized from isopropanol and ether to provide 4-o-allyloxyphenyl-1-piperazinepentanol, monohydrochloride; M.P. 125–127° C. This product has the formula,

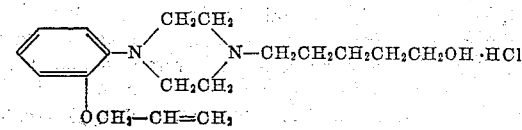

The starting material, 1-o-allyloxyphenylpiperazine, can be prepared from o-allyloxyaniline in the following manner.

*1-o-allyloxyphenylpiperazine.*—A solution of 300 g. of o-allyloxyaniline and 312 g. of bis(β-bromoethyl)amine hydrobromide in 2 liters of butanol is stirred and refluxed for sixteen hours. A solution of 150 g. of sodium hydroxide in 300 ml. of water is slowly added and the mixture steam-distilled to remove the butanol. The residue is cooled and extracted with ether and the ethereal solution is dried over solid sodium hydroxide. The ethereal solution is separated by decantation and distilled under reduced pressure to remove ether and excess o-allyloxyaniline. Continued distillation of the residue under reduced pressure provides 1-o-allyloxyphenylpiperazine; B.P. 105–109° C. (0.25 mm. mercury).

*Example 10*

A solution of 20 g. of 1-o-ethoxyphenylpiperazine and 20 ml. of methyl acrylate in 100 ml. of ether is allowed to stand sixteen to eighteen hours at 23–25° C. The solvent and excess methyl acrylate are taken off under reduced pressure. The residue is dissolved in 100 ml. of anhydrous ether and added to a stirred slurry of 5 g. of lithium aluminum hydride in 700 ml. of ether. The reaction mixture is then stirred for thirty minutes and the complex decomposed by the cautious addition of an excess of aqueous sodium hydroxide. The ether layer is removed by decantation, dried over anhydrous magnesium sulfate and filtered. The ether is removed by distillation and the residue is triturated with low-boiling petroleum ether until crystallization occurs. The product is removed by filtration and recrystallized from a mixture of ether and low-boiling petroleum ether to provide 4-o-ethoxyphenyl-1-piperazinepropanol. This product has the formula,

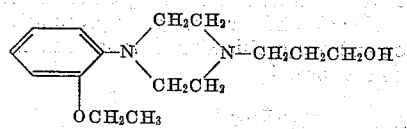

*Example 11*

(a) 41.2 grams of 1-o-ethoxyphenylpiperazine added to a solution of 5 g. of metallic sodium and 130 ml. of allyl alcohol is refluxed with stirring for eighty hours. The reaction mixture is cooled, diluted with 250 ml. of water and the alkyl alcohol is removed by vacuum distillation. The residue is extracted with benzene, the benzene extract charcoaled with 2 percent activated charcoal and filtered, and the solvents are taken off by distillation under reduced pressure. The residual product is 4-o-ethoxyphenyl-1-piperazinepropanol. The sulfuric acid salt is obtained by dissolving the product in ethanol containing an equimolar quantity of sulfuric acid and recovering the precipitate formed, by filtration and recrystallization from isopropanol. The sulfuric acid salt product has the formula,

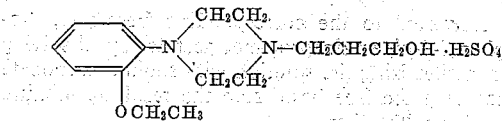

(b) 5 g. of 4-o-ethoxyphenyl-1-piperazinepropanol is dissolved in a mixture of 10 ml. of glacial acetic acid and 1.9 ml. of acetic anhydride. The solution is stirred and warmed for one-half hour and is then treated with one equivalent of isopropanolic hydrogen chloride and diluted with ether. The product, which separates, is collected and recrystallized from isopropanol and ether to yield the hydrochloride salt of 4-o-ethoxyphenyl-1- piperazinepropanol acetate. This product which has the formula,

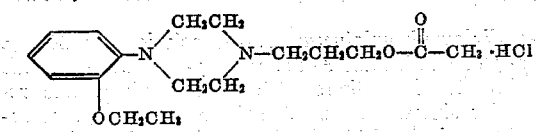

is converted to the corresponding free base, 4-o-ethoxyphenyl-1-piperazinepropanol acetate, by dissolving in water, neutralizing the solution with sodium bicarbonate and recovering the free base from the resulting mixture by extraction with ether.

Example 12

(a) 35.2 g. of 1-o-methylphenylpiperazine added to a solution of 5 g. of metallic sodium and 130 ml. of allyl alcohol is refluxed with stirring for eighty hours. The reaction mixture is cooled, diluted with 250 ml. of water and substantially all of the allyl alcohol is removed by vacuum distillation. The residue is extracted with benzene and the benzene solution charcoaled with activated charcoal and filtered. The filtrate is concentrated to about 75 ml. and diluted with three volumes of low-boiling petroleum ether. The crude material which crystallizes on cooling is recrystallized from a mixture of benzene and low-boiling petroleum ether. This product is 4-o-methylphenyl-1-piperazinepropanol; M.P. 99–101° C. The product has the formula,

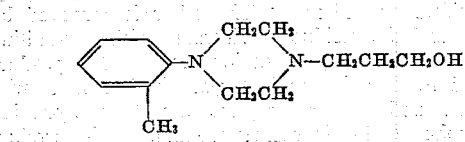

The sulfuric acid salt is obtained by dissolving the above free base in ethanol containing an equimolar quantity of sulfuric acid and recovering the precipitate formed by filtration and recrystallization from isopropanol. This product has the formula,

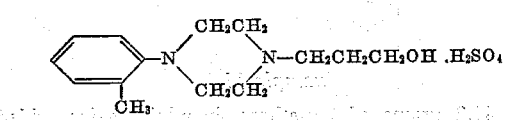

(b) 7 grams of 4-o-methylphenyl-1-piperazine-propanol is dissolved in a mixture of 20 ml. of glacial acetic acid and 3 ml. of acetic anhydride. The solution is stirred and warmed for one-half hour and is then treated with one equivalent of isopropanolic hydrogen chloride and diluted with ether. The product, which separates, is collected and recrystallized from isopropanol and ether to yield the hydrochloride salt of 4-o-methylphenyl-1-piperazinepropanol acetate. This product, which has the formula,

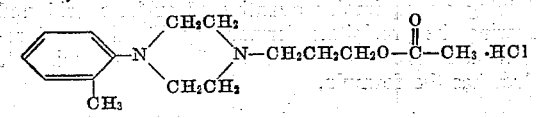

can be converted to the corresponding free base, 4-o-methylphenyl-1-piperazinepropanol acetate, by dissolving in water, neutralizing the solution with sodium carbonate and recovering the free base from the resulting mixture by extraction with ether.

Example 13

A mixture of 35.2 g. of 1-o-methylphenyl piperazine, 15.3 g. of tetramethylene bromohydrin and 200 ml. of toluene is stirred with refluxing for eight hours. The reaction mixture is cooled and filtered and the filtrate is concentrated to about 75 ml. under reduced pressure. This residue is diluted with four volumes of low-boiling petroleum ether and the oil which separates is removed by decantation. This oil is taken up in isopropanol containing an equivalent of dry hydrogen chloride. The precipitate which forms is removed by filtration and recrystallized twice from isopropanol to yield 4-o-methylphenyl - 1 - piperazinebutanol monohydrochloride, M.P. 154–156° C. This product has the formula,

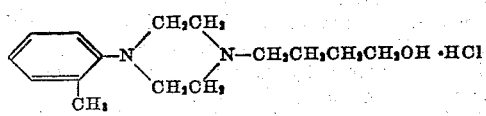

Example 14

A mixture of 35.2 g. of 1-o-methylphenylpiperazine, 19.5 g. of ethyl-γ-bromobutyrate and 200 ml. of benzene is refluxed for seven hours with stirring. The reaction mixture is filtered and cooled and the filtrate containing ethyl-4-o-methylphenyl - 1 - piperazinebutyrate is evaporated to about 100 ml. and then added to a stirred solution of 4 g. of lithium aluminum hydride in 500 ml. anhydrous ether. When the reaction is complete, an excess of aqueous alkali is cautiously added. The ethereal layer is removed by decantation and dried with anhydrous potassium carbonate. The desiccant is removed by filtration and the ether is removed by evaporation in vacuo. The residual product, 4-o-methylphenyl-1-piperazinebutanol, has the formula,

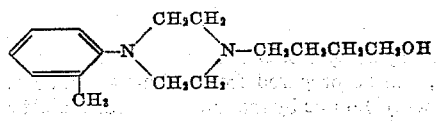

The product is converted to the monohydrochloride by the addition of one equivalent of isopropanolic hydrogen chloride. The precipitate is removed and recrystallized from isopropanol to yield 4-o-methylphenyl-1-piperazinebutanol monohydrochloride; M.P. 154–156° C. This product has the formula,

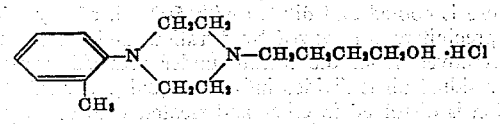

Example 15

A mixture of 35.2 g. of 1-o-methylphenylpiperazine, 16.2 g. of delta-bromovaleronitrile and 200 ml. of benzene is stirred and refluxed for sixteen hours. The reaction mixture is cooled and filtered and the benzene is removed from the filtrate under reduced pressure. The crude 4-o-methylphenyl-1-piperazinevaleronitrile is dissolved in 50 ml. of absolute alcohol and slowly added to 200 ml. of absolute ethanol which has been saturated with dry hydrogen chloride at 0–5° C. maintaining the temperature at or below 10° C. throughout the addition. The resulting mixture is again saturated with a dry hydrogen chloride at 5° C. and stirred at 5° for thirty minutes. 1.8 ml. of water is added and the mixture is slowly warmed to refluxing. The stirring and refluxing are continued for four hours. The solution is filtered hot and the filtrate is concentrated under reduced pressure to a semi-crystalline syrup. This material is dissolved in ice water, treated with an excess sodium bicarbonate and extracted with ether. The ethereal solution containing ethyl 4-o-methylphenyl-1-piperazinevalerate is dried over anhydrous magnesium sulfate. The desiccant is removed and the ethereal solution is slowly added to a stirred solution of 6 g. of lithium aluminum hydride in 500 ml. of dry ether. When the reaction is complete, an excess of aqueous alkali is added cautiously. The ethereal solution is removed and dried over anhydrous potassium carbonate. The desiccant is removed by filtration and the ether is removed by evaporation in vacuo. The residual product, 4-o-methylphenyl-1-piperazinepentanol, has the formula,

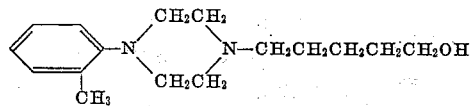

The product is converted to the monohydrochloride by the addition of one equivalent of isopropanolic hydrogen chloride. The precipitate is isolated by filtration and recrystallized from isopropanol to yield 4-o-methylphenyl-1-piperazinepentanol monohydrochloride; M.P. 172-173° C. This product has the formula,

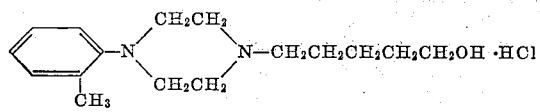

Example 16

A mixture of 38 g. of 1-o-ethylphenylpiperazine, 16.7 g. of pentamethylene bromohydrin and 250 ml. of toluene is refluxed for twelve houres with stirring. 150 ml. of ether is added and the solution is removed by decantation. The solvent is removed by vacuum distillation and the residual oil is triturated with low-boiling-point petroleum ether with chilling until crystallization occurs. The crystalline material obtained is dissolved in 25 ml. of isopropanol and the solution added to isopropanol containing one equivalent of hydrogen chloride. The resulting precipitate 4-o-ethylphenyl-1-piperazinepentanol monohydrochloride, is isolated by filtration and purified by recrystallization from isopropanol. This product has the formula,

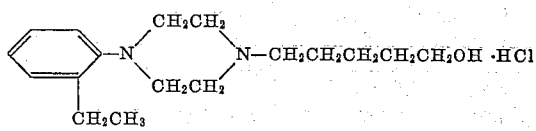

The starting material, 1-o-ethylphenylpiperazine, can be prepared by the following method:

A solution of 78 g. of o-ethylaniline, 100 g. of bis(β-bromoethyl)amine hydrobromide and 400 ml. of dry butanol is stirred and refluxed for twenty hours. 35 grams of anhydrous sodium carbonate is added and the butanol and excess o-ethylaniline is removed by steam distillation. The remaining residue is made basic with sodium hydroxide and extracted with ether. The ether is removed by distillation and the residue is distilled in vacuo to yield 1-o-ethylphenylpiperazine.

Example 17

17.9 grams of 5-carbomethoxyvaleryl chloride is added to a solution of 35.2 g. of 1-o-methylphenylpiperazine in 300 ml. of benzene and the mixture is stirred for thirty minutes. The reaction mixture is cooled and filtered and the solvent is removed by distillation in vacuo. The residue, containing 1-o-methylphenyl-4-(5-carbomethoxyvaleryl)piperazine, is dissolved in 100 ml. of anhydrous ether and slowly added to a stirred solution of 7 g. of lithium aluminum hydride in 500 ml. of anhydrous ether. When the reaction is complete, an excess of aqueous alkali is cautiously added. The ethereal layer is removed and dried over anhydrous magnesium sulfate. After removing the drying agent by decantation, the crude 4-o-methyl-1-piperazinehexanol is converted to the monohydrochloride with one equivalent of isopropanolic hydrogen chloride. The precipitate is removed and recrystallized from isopropanol to yield 4-o-methylphenyl-1-piperazinehexanol monohydrochloride; M.P. 141-142° C. This product has the formula,

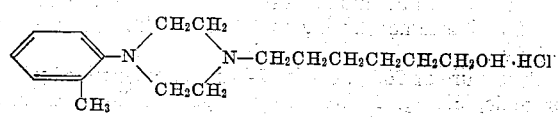

5-carbomethoxyvaleryl chloride, employed as a starting material, can be prepared in quantitative yield by refluxing a solution of 100 g. of monomethyl adipate and 120 g. of thionyl chloride in 250 ml. of carbon tetrachloride until the evolution of hydrogen chloride is complete (one and one-half to two hours), concentrating the reaction mixture to about 200 ml. and distilling the residue under reduced pressure. 5-carbomethoxyvaleryl chloride boils at 126-127° C. (24 mm. mercury).

Example 18

17.9 grams of 5-carbomethoxyvalerylchloride is added to a solution of 43.6 g. of 1-o-butylphenylpiperazine in 300 ml. of benzene and the mixture is stirred for thirty minutes. The reaction mixture is cooled and filtered and the solvent is taken off by distillation in vacuo. The residue, containing 1-o-butylphenyl-4-(5-carbomethoxyvaleryl)-piperazine, is dissolved in 100 ml. of anhydrous ether and slowly added to a stirred solution of 7 g. of lithium aluminum hydride in 500 ml. of anhydrous ether. When the reaction is complete, an excess of aqueous alkali is cautiously added. The ethereal layer is removed and dried over anhydrous magnesium sulfate. The solution is separated from the drying agent by decantation and mixed with one equivalent of isopropanolic hydrogen bromide. The resulting precipitate is removed and recrystallized from isopropanol to yield the 4-o-butylphenyl-1-piperazinehexanol, monohydrobromide. This product has the formula,

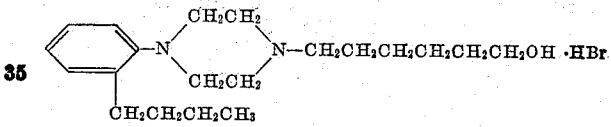

The corresponding free base, 4-o-butylphenyl-1-piperazinehexanol, is obtained by dissolving the above hydrobromide salt in water, neutralizing the solution with dilute aqueous sodium hydroxide, and extracting the mixture with ether. The ethereal extracts are washed with water, dried, and the ether is taken off by vacuum distillation.

The starting material, 1-o-butylphenylpiperazine, can be prepared from o-butylaniline in the following manner:

A solution of 96 g. of o-n-butylaniline, 100 g. of bis(β-bromoethyl)amine hydrobromide and 400 ml. of dry butanol is stirred and heated at reflux temperature for twenty hours. 35 grams of anhydrous sodium carbonate is added and the butanol and excess o-butylaniline is removed by steam distillation. The remaining residue is made basic with sodium hydroxide and extracted with ether. The ether is removed by distillation and the residue is distilled in vacuo to yield 1-o-butylphenylpiperazine.

Example 19

A solution of 19 g. of 1-o-ethylphenylpiperazine and 20 ml. of methyl acrylate in 100 ml. of ether is allowed to stand sixteen to eighteen hours at 23-25° C. The solvent and excess methyl acrylate are taken off under reduced pressure. The residue is dissolved in 100 ml. of anhydrous ether and added to a stirred slurry of 5 g. of lithium aluminum hydride in 700 ml. of ether. The reaction mixture is then stirred for thirty minutes and the complex decomposed by the cautious addition of an excess of aqueous sodium hydroxide. The ether layer is removed by decantation, dried over anhydrous magnesium sulfate and filtered. The ether is removed by distillation and the residue is triturated with low-boiling petroleum ether until crystallization occurs. The product is removed by filtration and recrystallized from a mixture of ether and low-boiling petroleum ether to provide 4-o- ethylphenyl-1-piperazine propanol. This product has the formula,

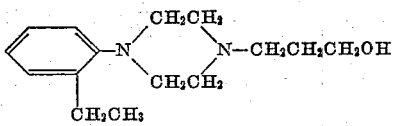

Example 20

A solution of 11.9 g. of 1-o-ethylphenylpiperazine and 100 ml. of diethyl adipate is maintained at 100° C. for three hours. The ethanol which is liberated is removed under reduced pressure and the solution again is maintained at 100° C. for three hours. The reaction mixture is cooled and diluted with 800 ml. of dry ether and treated with an excess of dry hydrogen chloride. The organic solvents are decanted and the residual gum containing 4-o-ethylphenyl-1-delta-carbethoxyvalerylpiperazine hydrochloride is treated with an excess of cold dilute aqueous sodium bicarbonate and extracted with ether. The ether extract is dried over anhydrous magnesium sulfate and the desiccant is removed by filtration. The dry ethereal solution of 4-o-ethylphenyl-1-delta-carbethoxyvalerylpiperazine is slowly added to a stirred solution of 7 g. of lithium aluminum hydride in 500 ml. of dry ether. When the reaction is complete, an excess of aqueous alkali is added with caution and the ethereal layer is removed and dried over anhydrous potassium carbonate. After the desiccant has been removed by filtration, the filtrate is poured into an excess of isopropanolic hydrogen chloride to form 4-o-ethylphenyl-1-piperazinehexanol dihydrochloride which is isolated by filtration and recrystallized from a mixture of isopropanol and ether. This product has the formula,

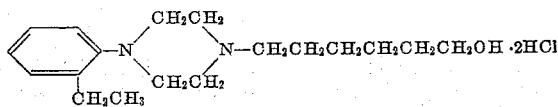

Example 21

(a) A solution of 38 g. of 1-o-ethylphenylpiperazine and 21 g. of 5-bromopentan-1-ol acetate in 200 ml. of toluene is stirred and refluxed for twelve hours, 100 ml. of the toluene is removed by distillation and the residual solution is cooled and diluted to 600 ml. with ether. The mixture is filtered and the solvent is taken off under reduced pressure. The residual oil is divided into two equal portions and one portion is treated with one equivalent of isopropanolic hydrogen chloride and diluted with ether. The resulting precipitate is collected and recrystallized from isopropanol. The product, 4-o-ethylphenyl-1-piperazinepentanol acetate, monohydrochloride, has the formula,

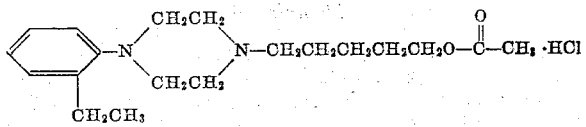

(b) The remaining portion of the residual oil of (a) is dissolved in 50 ml. of methanol. A solution of 3 g. of sodium hydroxide in 10 ml. of water, or a solution of 1 g. of sodium methoxide in absolute alcohol, is added and the resulting solution refluxed for six hours. The solvent is taken off by distillation and 150 ml. of water is added to the residue. The mixture is extracted with ether. The ethereal solution is dried over anhydrous magnesium sulfate, filtered, and the ether is removed by distillation. The residual product, 4-o-ethylphenyl-1-piperazinepentanol, is purified by recrystallization from a mixture of ether and low-boiling petroleum ether. The product has the formula,

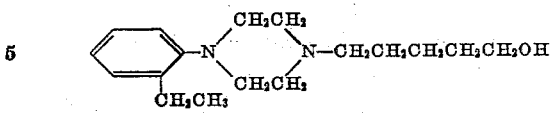

Example 22

A mixture of 46 g. of 1-(2,3-dichlorophenyl)-piperazine, 21 g. of 5-bromopentanol, acetate ester and 50 ml. of benzene is allowed to stand at room temperature for twenty hours. The reaction mixture is diluted to 600 ml. with ether and filtered. The filtrate is concentrated over a steam bath and the residue dissolved in 450 ml. of methanol. Sodium methoxide (2 g.) is added and the solvent taken off by evaporation. The residue is diluted to 600 ml. with ether, washed three times with 200 ml. of water, dried over anhydrous magnesium sulfate, and the ether is removed by distillation. The residual product, 4-(2,3-dichlorophenyl)-1-piperazinepentanol, is treated with an excess of isopropanolic hydrogen chloride, diluted with ether, stirred and filtered. The filter cake, 4-(2,3-dichlorophenyl)-1-piperazinepentanol monohydrochloride, is purified by recrystallization from a mixture of isopropanol and ether: M.P. 183–184° C.

The starting piperazine material can be prepared as follows:

A mixture of 307 g. of 2,3-dichloroaniline, 200 g. of diethanolamine and 320 ml. of concentrated hydrochloric acid is heated rapidly to 220–225° C. and the temperature maintained at 220–225° C. for one to one and a half hours. At this point no further water or hydrogen chloride is given off. Aqueous alkali is added to the warm reaction mixture and the mixture extracted with one liter of ether. The extract is washed twice with one liter of water, once with one liter of water and once with 500 ml. of 5 normal sodium hydroxide solution, and is dried with anhydrous magnesium sulfate. The ether is removed under vacuum and the residue subjected to vacuum distillation. The desired product, 1-(2,3-dichlorophenyl)-piperazine, is obtained as the fraction boiling at 128–130° C. (0.5 mm.). The product is converted to the corresponding monohydrochloride by treating with isopropanol containing excess hydrogen chloride. The crystalline 1-(2,3-dichlorophenyl)-piperazine monohydrochloride which forms is filtered off and recrystallized from isopropanol; M.P. 315–318° C.

Example 23

A mixture of 51 g. of 1-(5-chloro-2-isopropoxyphenyl)-piperazine, 21 g. of 5-bromopentanol-1-actetate ester and 50 ml. of benzene is allowed to stand at 20–25° C. for six days. The solvent is removed by distillation over a steam bath and the residue triturated with ether until it crystallizes. The crystals are removed by filtration and the filtrate is concentrated over a steam bath to remove the solvent. The residual product, 4-(5-chloro-2-isopropoxyphenyl)-1-piperazinepentanol, acetate ester, is dissolved in 400 ml. of methanol, 2 g. of sodium methoxide is added and the solvents again removed by distillation. The residue is diluted with 500 ml. of ether; the ethereal residue is washed three times with water and then dried with anhydrous magnesium sulfate. The ether is removed and the residue is distilled in vacuo. The product, 4-(5-chloro-2-isopropoxyphenyl)-1-piperazinepentanol, is obtained as the fraction boiling at 180–190° C. (0.3 mm.). The product is converted to the monohydrochloride with isopropanolic hydrogen chloride. Sufficient ether is added to induce crystallization and the crystals removed by filtration; M.P. (monohydrochloride) 149–151° C.

The piperazine starting material can be prepared as follows:

A mixture of 500 g. of bis-(2-bromoethyl)amine hydrobromide, 635 g. 5-chloro-2-isopropoxy-aniline and one liter of chlorobenzene is stirred and refluxed for four hours. The reaction mixture is steam distilled to remove the chlorobenzene, an excess of aqueous 40% sodium hydroxide solution is cautiously added to the residue and the mixture is extracted with ether. The extracts are washed with water and with dilute sodium hydroxide solution, dried and subjected to fractional distillation. The product, 1-(5-chloro-2-isopropoxyphenyl)-piperazine, is collected as the fraction boiling at 150–152° C. (0.5 mm.).

In like manner, the corresponding 1-(2,5-dimethylphenyl)-1-piperazinepentanol and its monohydrochloride (M.P. 208–209° C.) and acetate ester derivatives can be prepared starting with 21 g. of 5-bromopentanol-1-acetate and 38 g. of 1-(2,5-dimethylphenyl)-piperazine. The latter, in turn, can be prepared by heating a mixture of 445 g. of 2,5-dimethylaniline, 368 g. of diethanolamine and 610 ml. of concentrated hydrochloric acid at 220° C. for three hours, cooling and making the reaction mixture thoroughly basic, and finally extracting the same with benzene and distilling the benzene extracts for the recovery of the product as the fraction boiling at 105–108° C. (1 mm.).

Example 24

A mixture of 42 g. of 1-(3-chloro-2-methylphenyl)-piperazine, 21 g. of 5-bromopentanol-1-acetate ester and 200 ml. of benzene is stirred and refluxed for sixteen hours. The reaction mixture is cooled, diluted to 1 liter with ether, stirred and filtered. The solvent is removed from the filtrate by evaporation, leaving as the residual product, 4-(3-chloro-2-methylphenyl) - 1 - piperazinepentanol, acetate ester. The residue is taken up in 500 ml. of methanol and 2 g. of sodium methoxide is added. The solvent is removed by evaporation, and the residue is diluted to 500 ml. with ether and washed three times with 200 ml. of water. The ethereal solution is dried over magnesium sulfate and the solvent is removed by evaporation. The residual product is 4-(3-chloro-2-methylphenyl)-1-piperazinepentanol; M.P. 71–73° C. after recrystallization from ether-petroleum ether mixture.

The piperazine starting material can be prepared in the following way:

A mixture of 519 g. of 3-chloro-2-methylaniline, 368 g. of diethanolamine and 610 ml. of concentrated hydrochloric acid is heated until the temperature reaches 220° C. The reaction mixture is then maintained at 220–223° C. for three hours, and is cooled and made strongly basic with 10% sodium hydroxide solution. The reaction mixture is extracted with benzene and the benzene extracts are washed first with water and then with concentrated sodium hydroxide solution. The extracts are subjected to distillation under reduced pressure; the product, 1-(3-chloro-2-methylphenyl)-piperazine, is collected as the fraction boiling at 121–124° C. (1 mm.).

Example 25

A mixture of 44.4 g. of 1-(2,5-dimethoxyphenyl)-piperazine, 21 g. of 5-bromopentanol-1-acetate ester and 200 ml. of toluene is stirred and heated at reflux temperature for fifteen hours. Toluene (150 ml.) is removed by distillation and the residue cooled, diluted with 500 ml. of ether and filtered. The filtrate is evaporated on a steam bath to remove the solvent; the residual product is 4-(2,5-dimethoxyphenyl)-1-piperazinepentanol, acetate ester. The residue is dissolved in 500 ml. of absolute methanol; 2 g. of sodium methoxide is added and the reaction mixture is again evaporated on a steam bath. The residue is dissolved in 50 ml. of ether, washed twice with an equivalent volume of water, dried over anhydrous magnesium sulfate, filtered and the ether removed by evaporation. The residual product, 4-(2,5-dimethoxyphenyl)-1-piperazinepentanol, is converted to the monohydrochloride by the addition of an equivalent of isopropanolic hydrogen chloride and then sufficient ether added to induce crystallization; M.P. 140–151° C.

The piperazine starting material can be prepared as follows:

A mixture of 400 g. of 2,5-dimethoxyaniline, 410 g. of bis-(2-bromoethyl)amine hydrobromide, and one liter of butanol is stirred and heated at reflux temperature for sixteen hours. Approximately 500 ml. of butanol is removed by distillation and a solution consisting of 105 g. of sodium hydroxide in 300 ml. of water is added. The mixture is steam distilled to remove the butanol and a small amount of dimethoxyaniline. The residue from the steam distillation is cooled and made basic with concentrated sodium hydroxide solution and extracted with ether. The ether is removed from the extract by distillation and the residue distilled under reduced pressure. After slowly stripping off the dimethoxyaniline the fraction boiling at 100–132° C. (0.5 mm.) is collected and redistilled. The product, 1-(2,5-dimethoxyphenyl)-piperazine, is collected as the fraction boiling at 127–132° C. (0.5 mm.).

Example 26

A mixture of 46 g. of 1-(2,3-dichlorophenyl)-piperazine and 19 g. of methyl acrylate is allowed to stand for sixteen hours at room temperature. The reaction mixture is diluted to 200 ml. with ether and slowly added to a slurry of 7.6 g. of lithium aluminum hydride in 600 ml. of ether. The mixture is stirred fifteen minutes after the final addition and decomposed with 8 ml. of water, 6 ml. of 20% sodium hydroxide and finally with 28 ml. of water. The reaction mixture is filtered and evaporated on a steam bath. The residue and filter cake are combined and extracted twice with boiling benzene. The benzene extracts are combined and evaporated to dryness. The residue is triturated with petroleum ether and filtered to give 4-(2,3-dichlorophenyl)-1-piperazinepropanol, M.P. 137–139° C. In monohydrochloride salt form the product melts at 210–211° C.

Example 27

5-carbomethoxyvalerylchloride (17.9 g.) is added to a solution of 46.2 g. of 1-(2,3-dichlorophenyl)-piperazine and 500 ml. of benzene. The mixture is stirred for one-half hour, filtered and the filtrate is concentrated to about 75 ml. and diluted with 300 ml. of anhydrous ether. The solution, containing 4-(2,3-dichlorophenyl)-1-delta-carbomethoxyvalerylpiperazine, is slowly added to a stirred solution of 7 g. of lithium aluminum chloride and 500 ml. of anhydrous ether. When the reduction is complete, an excess of aqueous alkali is added cautiously. The ethereal layer is removed, dried over anhydrous potassium carbonate and filtered. The solvents are removed from the filtrate by evaporation under reduced pressure; the residual product is 4-(2,3-dichlorophenyl)-1-piperazinehexanol.

Example 28

A mixture of 54.2 g. of 1-(5-bromo-2-methoxyphenyl)-piperazine, 19.5 g. of ethyl γ-bromobutyrate and 200 ml. of benzene is stirred at reflux temperature for twelve hours. The reaction mixture is cooled, filtered and the solvent removed from the filtrate by distillation. The residue is distilled under reduced pressure to yield ethyl 4-(5-bromo-2-methoxyphenyl)-1-piperazinebutyrate which is then dissolved in anhydrous ether and added with stirring to 4 g. of lithium aluminum hydride dissolved in 500 ml. of anhydrous ether. When reduction is complete, an excess of aqueous alkali is added and the ethereal solution is decanted and dried with anhydrous potassium carbonate. The drying agent is removed by filtration and the ether is removed from the filtrate by evaporation on a steam bath. The residual product is 4-(5-bromo-2-methoxyphenyl)-1-piperazinebutanol.

This application is a continuation-in-part of my co-pending applications Serial Nos. 518,997, filed July 29, 1955, now abandoned, and 518,998, filed June 29, 1955, and Serial No. 617,255, filed October 22, 1956, now abandoned.

I claim:
1. A compound of the class consisting of N-phenyl-piperazines and acid addition salts thereof having in free base form the formula

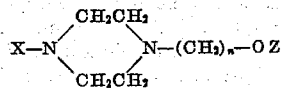

where $n$ is an integer from 3 to 6 inclusive, Z is a member of the class consisting of hydrogen and lower fatty acid acyl groups, and X is a substituted phenyl radical selected from the group consisting of

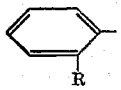 and 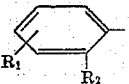

where R represents a member of the class consisting of allyloxy and alkyl and alkoxy radicals containing not more than four carbon atoms, and $R_1$ and $R_2$ each represent a member of the class consisting of bromine and chlorine radicals, alkyl radicals containing 1 to 3 carbon atoms and alkoxy radicals containing 1 to 5 carbon atoms, $R_1$ being substituted in the phenyl ring at one of the three and five positions.

2. A 4-o-(lower alkyl)oxyphenyl-1-piperazinepentanol.
3. 4-o-ethoxyphenyl-1-piperazinepentanol.
4. 4-(2,3-dichlorophenyl)-1-piperazinepentanol.
5. 4-(5-chloro-2-isopropoxyphenyl)-1-piperazinepentanol.
6. 4-(3-chloro-2-methylphenyl)-1-piperazinepentanol.

References Cited in the file of this patent
UNITED STATES PATENTS
2,836,594   Parcell _____ May 27, 1958

OTHER REFERENCES

Davis et al.: J. Chem. Soc. (London), pp. 2831-4 (1949).

Pollard et al.: J. Amer. Chem. Soc., vol. 76, pp. 1853-55 (1954).